(12) United States Patent
Gerashchenko et al.

(10) Patent No.: US 10,504,045 B2
(45) Date of Patent: Dec. 10, 2019

(54) AUDIT SCHEDULE DETERMINATION

(71) Applicant: SAP SE, Walldorf (DE)

(72) Inventors: Maxym Gerashchenko, Heidelberg (DE); Gordon Muckle, Altrip (DE)

(73) Assignee: SAP SE, Walldorf (DE)

( * ) Notice: Subject to any disclaimer, the term of this patent is extended or adjusted under 35 U.S.C. 154(b) by 522 days.

(21) Appl. No.: 15/336,481

(22) Filed: Oct. 27, 2016

(65) Prior Publication Data

US 2018/0121484 A1 May 3, 2018

(51) Int. Cl.
*G06Q 10/06* (2012.01)

(52) U.S. Cl.
CPC ... *G06Q 10/06314* (2013.01); *G06Q 10/0639* (2013.01)

(58) Field of Classification Search
CPC ............. G06F 16/24573; G06F 3/1207; G06F 16/137; G06F 16/1752; G06F 16/182; G06F 3/067; G06F 8/427; G06F 21/552; G06F 3/0649; G06F 11/004
USPC ........... 707/600–831, 899, 999.001–999.206
See application file for complete search history.

(56) References Cited

U.S. PATENT DOCUMENTS

| | | | | |
|---|---|---|---|---|
| 6,154,816 A * | 11/2000 | Steely | ............. | G06F 9/52 711/121 |
| 7,047,337 B2 * | 5/2006 | Armstrong | ............ | G06F 9/52 710/104 |
| 7,145,898 B1 * | 12/2006 | Elliott | ................. | H04L 12/66 370/352 |
| 2001/0012775 A1 * | 8/2001 | Modzelesky | ...... | H04B 7/18539 455/427 |
| 2004/0010709 A1 * | 1/2004 | Baudoin | ................ | G06Q 40/08 726/25 |
| 2009/0172035 A1 * | 7/2009 | Lessing | ................. | G06F 16/284 |
| 2009/0319672 A1 * | 12/2009 | Reisman | ................ | H04N 21/25 709/227 |
| 2011/0126111 A1 * | 5/2011 | Gill | ........................ | G06F 21/55 715/736 |
| 2012/0011077 A1 * | 1/2012 | Bhagat | .................. | G06F 21/554 705/317 |
| 2013/0245820 A1 * | 9/2013 | Osborne | ................. | G07F 9/026 700/236 |

* cited by examiner

*Primary Examiner* — Angelica Ruiz
(74) *Attorney, Agent, or Firm* — Fountainhead Law Group, P.C.

(57) ABSTRACT

An audit schedule is determined from a database storing a master data set comprising audit events, system parameters, and resources. Audit events are grouped according to information of the master data set, for example shared units (e.g., product, service, organization, risk level, audit type, etc.). Audit groups are prioritized by factors such as unit priority and audit duration. A random audit event within the group is chosen, and then a time slot is selected according to a desired distribution (e.g., left-to-right), determining resource availability for that slot. The procedure may optionally consider additional constraints (e.g., manually added, national holidays, auditor availability) outside the master data set. The procedure shuffles through audit events of the group with the highest priority, and then through audit events of lower priority groups, filling out the audit schedule according to resource availability and constraints. Audit schedule changes are recorded in a change log data object.

19 Claims, 16 Drawing Sheets

| Audit Type | ID_Audit Type | Duration |
|---|---|---|
| Technical | TA | 10 |
| Process | PA | 5 |
| Goverment | GA | 5 |
| Financial | FA | 7 |

| ID_Audit Type | Required_FTE |
|---|---|
| TA | 1 |
| PA | 2 |
| GA | 1 |
| FA | 2 |

| ID_Unit | Unit | Risk_level |
|---|---|---|
| 001 | AGS | medium |
| 002 | AMS | high |
| 003 | Ariba | high |
| 004 | Backup service te | high |
| 005 | BCCM | high |
| 006 | ByD | medium |
| 007 | SAP Consulting S | high |

| ID_Unit | ID_Audit_type | Priority |
|---|---|---|
| 001 | TA | medium |
| 001 | FA | low |
| 002 | TA | high |
| 002 | FA | medium |
| 002 | GA | medium |
| 003 | TA | high |
| 003 | PA | high |
| 003 | GA | high |
| 004 | TA | high |
| 005 | PA | medium |

FIG. 5

| Calendar Year | 2015 | 2015 | 2015 | 2015 | 2015 | 2015 | 2015 | 2015 | 2015 | 2015 | 2015 |
|---|---|---|---|---|---|---|---|---|---|---|---|
| Calendar Week | CW | CW | CW | CW | CW | CW | CW | CW | CW | CW | CW |
| | 1 | 2 | 3 | 4 | 5 | 6 | 7 | 8 | 9 | 10 | 11 |
| Block | x | x | | | | | | | | | x |
| Parallel Audit 1 | | | 45⦂ TA⦂ HEC⦂ Klaus | M1 FA Global Travel | | 48⦂ TA⦂ AMS⦂ Freddy | 5⦂ FA⦂ GPO⦂ Arbit Rage | | 6⦂ FA⦂ Consulting Services Ale Ginger | | |
| Parallel Audit 2 | | | 3⦂ FA⦂ GFM⦂ Sandra Lederer | 4⦂ FA⦂ HR⦂ Ale Ginger | | | 49⦂ TA⦂ HCP⦂ Melissa | 22⦂ PA⦂ Ariba⦂ Susanne | 23⦂ PA⦂ GPA⦂ Sonny | 29⦂ PA⦂ MCD⦂ Susanne | |
| Parallel Audit 3 | | | 46⦂ TA⦂ Ariba⦂ Boyer | 47⦂ TA⦂ Backup services⦂ | 50⦂ TA⦂ Security Monitori⦂ | 44⦂ TA⦂ SFSF⦂ Bugsy | 26⦂ PA⦂ Global Treasury⦂ Fritz | 74⦂ GA⦂ KPS⦂ | 69⦂ GA⦂ HEC⦂ Elsa | 70⦂ GA⦂ S/4HANA develop | |

| 2015 CW 11 | 2015 CW 12 | 2015 CW 13 | 2015 CW 14 | 2015 CW 15 | 2015 CW 16 | 2015 CW 17 | 2015 CW 18 | 2015 CW 19 | 2015 CW 20 | 2015 CW 21 | 2015 CW 22 | 2015 CW 23 |
|---|---|---|---|---|---|---|---|---|---|---|---|---|
| x | | | | | | | | | | | | |
| | | | | M2 PA | | | | | | | | |
| | Partner mgmt② | | | Global Travel | Global Treasury② | Global Treasury② | Global Commun | GPO③ | Training Center② | Training Center② | Global Travel② | |
| | Sandra Lederer | | | | Sandra Lederer | Sandra Lederer | Fritz | Fritz | Arbit Rage | Arbit Rage | Ale Ginger | |
| | 24③ | 27③ | 1③ | | 68③ | 73③ | 9③ | 66③ | 54③ | 55③ | 36③ | 38③ |
| | PA③ | PA③ | FA③ | | GA③ | GA③ | FA③ | GA③ | TA③ | TA③ | PA③ | PA③ |
| | MCS③ | HEC③ | GFA③ | | Ariba③ | Sales③ | Global | | SAP Lab | FSN③ | Global | Consultin |
| | Fritz Cat | Sonny | Arbit Rage | | Elsa | Fritz | Communications③ | | IT③ | Melissa | Commun & | |
| | 72③ | 67③ | 25③ | 28③ | 58③ | 51③ | 53③ | 57③ | 56③ | 52③ | 81③ | 80③ |
| | GA③ | GA③ | PA③ | PA③ | TA③ | TA③ | TA③ | TA③ | TA③ | TA③ | GA③ | GA③ |
| | MCS③ | HANA | SFSF③ | HR③ | AGS③ | ByD③ | Dev | Global | HR③ | HC③ | AMS③ | HCP③ |
| | Elsa | develop | Fritz Cat | Susanne | Klaus | Boyer | Infrastruc | Treasury② | Boyer | Klaus | Elsa | Fritz |

FIG. 8B

| 2015 CW 24 | 2015 CW 25 | 2015 CW 26 | 2015 CW 27 | 2015 CW 28 | 2015 CW 29 | 2015 CW 30 | 2015 CW 31 | 2015 CW 32 | 2015 CW 33 | 2015 CW 34 |
|---|---|---|---|---|---|---|---|---|---|---|
| 10❚ | | 15❚ | | 13❚ | | 11❚ | | 16❚ | | |
| FA❚ | | FA❚ | | FA❚ | | FA❚ | | FA❚ | | |
| Support❚ | | KPS❚ | | AMS❚ | | SAP IT❚ | | Dev Lab❚ | | x |
| Sandra Lederer | | Arbit Rage | | Sandra Lederer | | Ale Ginger | | Arbit Rage | | |
| 34❚ | 33❚ | 35❚ | 30❚ | 31❚ | 37❚ | 32❚ | 64❚ | 63❚ | 60❚ | |
| PA❚ | PA❚ | PA❚ | PA❚ | PA❚ | PA❚ | PA❚ | TA❚ | TA❚ | TA❚ | |
| Support❚ | S/4HANA | BCCM❚ | Vendor | Global | P&I❚ | HANA | GFA❚ | Fiori❚ | Corporat | |
| Fritz Cat | develop | Fritz Cat | Manage | Legal❚ | Susanne | develop | Bugsy | Klaus | e Portal❚ | |
| 77❚ | 78❚ | 79❚ | 75❚ | 82❚ | 76❚ | 59❚ | 61❚ | 65❚ | 62❚ | |
| GA❚ | GA❚ | GA❚ | GA❚ | GA❚ | GA❚ | TA❚ | TA❚ | TA❚ | TA❚ | |
| Vendor | SFSF❚ | GFA❚ | Support❚ | P&I❚ | GFM❚ | SAP IT❚ | Global | KPS❚ | Training | |
| Manage | Fritz | Elsa | Fritz | Elsa | Fritz | Freddy | Travel❚ | Boyer | Center❚ | |

| Change_Event | |
|---|---|
| ID_Event | 7 |
| Audit_Type | FA |
| Audit_Area | Partner mgmt |
| Audit_Area_Level | high |
| Audit Area_Criteria | |
| Start_Date (Click to change) | Montag, März 16, 2015 |
| End_Date (Click to change) | Dienstag, März 24, 2015 |
| Duration | 7 |
| Resources | Sandra Lederer; Ale Ginger |

Back/Confirm Changes

Confirm Changes and recalculate

Change_Log

|Gerashchenko, Maxym/04.12.2015 11:39:44/ Audit Schedule approved by Ralph

FIG. 10

AUDIT SCHEDULE DETERMINATION

BACKGROUND

Unless otherwise indicated herein, the approaches described in this section are not prior art to the claims in this application and are not admitted to be prior art by inclusion in this section.

Embodiments relate to risk management, and in particular to methods and apparatuses that implement audit scheduling.

As an independent actor, an internal audit department seeks to improve operations of other departments through evaluation of their business processes. The internal audit department advises management and board directors for recommended improvements in the audited areas.

Defining a feasible scope for audit activities, can offer a challenge. In order to properly manage risk, it is desirable for the internal audit department to create an integral annual audit plan including final approval by the management board.

Typically, internal audit departments create their audit plans manually and with several iterations. This planning step is accordingly both time- and resource-consuming.

Moreover, the large role of human discretion played in manual audit planning can undesirably degrade the independence of the audit process, potentially introducing unwanted biases or prejudices.

SUMMARY

Embodiments provide automated determination of an audit schedule. A database stores a master data set comprising audit events, system parameters, and resources. A scheduling engine groups the audit events according to information present in the master data set, for example shared units (e.g., product, service, organization, risk level, audit type, etc.). The audit groups are then prioritized according to factors such as duration and unit priority. The engine chooses a random event within the group and then selects a time slot according to a desired distribution scheme (e.g. left-to-right or evenly distributed), determining resource availability for that time slot. For this determination, the engine may optionally further consider additional constraints (e.g., manually added, national holidays, auditor availability) outside the master data set. The engine proceeds to shuffle through audit events of the group with the highest priority and duration, and then through audit events of corresponding lower priority groups, in order to fill out the audit schedule according to resource availability and constraints. Upon completion and approval, changes to the audit schedule are recorded in a change log data object that is also stored in the database. Embodiments may be particularly suited to implement the scheduling engine by leveraging the processing power of an available in-memory database engine.

An embodiment of a computer-implemented method comprises creating a plurality of audit event data objects from master data stored in a database, the master data comprising audit objects, system parameters, and resources. Audit groups are created by determining unit types of the master data shared between the audit event data objects. A priority of the audit groups is established. An audit group is randomly selected from one of the plurality of audit groups according to the priority and a duration. Availability of a resource during a time slot selected based upon a distribution, is determined. Where availability is present, the audit event is assigned to the time slot. Remaining audit event data objects are shuffled through according to the priority, to assign time slots and resources to the remaining audit event data objects. An audit schedule comprising the plurality of audit event data objects including respective time slot and resource assigned, is stored in the database.

A non-transitory computer readable storage medium embodies a computer program for performing a method comprising creating a plurality of audit event data objects from master data stored in a database, the master data comprising audit objects, system parameters, and resources. Audit groups are created by determining unit types of the master data shared between the audit event data objects, wherein the unit type comprises a product, a service, or an organization. A priority of the audit groups is established. An audit event data object is randomly selected from one of the plurality of audit groups according to the priority and a duration. Availability of a resource during a time slot selected based upon a distribution, is determined. Where availability is present, the audit event is assigned to the time slot. Remaining audit event data objects are shuffled through according to the priority, to assign time slots and resources to the remaining audit event data objects. An audit schedule comprising the plurality of audit event data objects including respective time slot and resource assigned, is stored.

An embodiment of a computer system comprises one or more processors and a software program, executable on said computer system. The software program is configured to cause an in-memory database engine to create a plurality of audit event data objects from master data stored in an in-memory database, the master data comprising audit objects, system parameters, and resources. The software program is configured to cause the in-memory database engine to create audit groups by determining unit types of the master data shared between the audit event data objects. The software program is configured to cause the in-memory database engine to establish a priority of the audit groups, and to randomly select an audit event data object from one of the plurality of audit groups according to the priority and a duration. The software program is configured to cause the in-memory database engine to determine availability of a resource during a time slot selected based upon a distribution. Where availability is present, the in memory database engine assigns the audit event to the time slot. The software program is configured to cause the in-memory database engine to shuffle through remaining audit event data objects according to the priority, to assign time slots and resources to the remaining audit event data objects. The software program is configured to cause the in-memory database engine to store in the in-memory database, an audit schedule comprising the plurality of audit event data objects including respective time slot and resource assigned.

In certain embodiments the distribution comprises left-to-right.

In some embodiments the distribution comprises an even distribution.

According to particular embodiments the priority is determined from a unit type priority stored in the database.

In various embodiments the duration comprises an audit type duration stored in the database.

In some embodiments the unit type comprises a product, a service, or an organization.

Certain embodiments further comprise recording in the database an approved change request in a change log data object of the audit schedule.

According to particular embodiments the database comprises an in-memory database and the determining is performed by an engine of the in-memory database.

The following detailed description and accompanying drawings provide a better understanding of the nature and advantages of embodiments.

BRIEF DESCRIPTION OF THE DRAWINGS

FIG. 5 shows different units and audit types

FIGS. 8-8D show an audit schedule according to an embodiment.

FIG. 9 shows an example of an individual assignment plan.

FIG. 10 shows an audit event according to an embodiment.

DETAILED DESCRIPTION

Described herein are methods and apparatuses for implementing audit scheduling. In the following description, for purposes of explanation, numerous examples and specific details are set forth in order to provide a thorough understanding of embodiments according to the present invention. It will be evident, however, to one skilled in the art that embodiments as defined by the claims may include some or all of the features in these examples alone or in combination with other features described below, and may further include modifications and equivalents of the features and concepts described herein.

Figure 1:
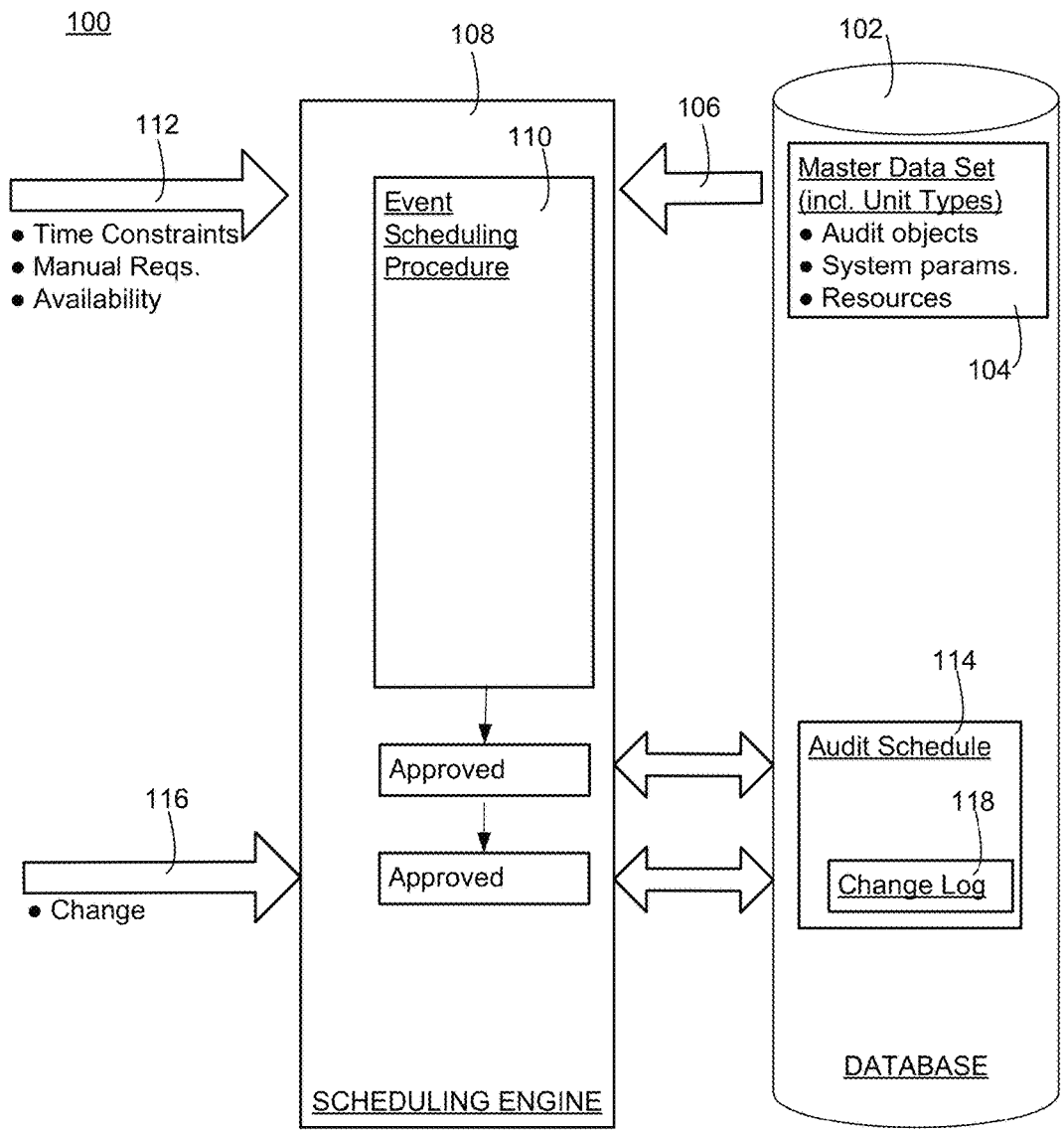
FIG. 1 shows a simplified diagram of a system according to an embodiment.

FIG. 1 shows a simplified view of a system configured to implement audit scheduling according to an embodiment. Specifically, system 100 comprises a database 102 storing a master data set 104 comprising audit events, system parameters, and resources.

The information present within the master data set may include unit type information. Examples of such units can include but are not limited to, product, service, organization, risk level, audit type.

In response to an input data 106 from the database, a scheduling engine 108 executes an event scheduling procedure 110. Details of various embodiments of this procedure are provided below in connection with FIG. 2, and also in the example of FIGS. 4-10.

In response to this input, the scheduling engine creates audit events as data objects, and then groups these audit events according to information such as shared unit types. The audit groups are then prioritized according to factors such as duration and unit priority.

The engine chooses a random event within the group and then selects a time slot according to a desired distribution (e.g., left-to-right or evenly distributed), determining resource availability for that time slot. For this determination, the engine may optionally further consider additional input 112 in the form of constraints (e.g., manually added, national holidays, auditor availability) outside to the master data set.

The engine proceeds to shuffle through events of the group with the highest priority and duration, and then through audit events of corresponding lower priority groups, in order to fill out the audit schedule according to resource availability and constraints. From groups having a same audit priority but a different duration of a single audit event, certain embodiments will consider the group with the longest duration first. The audit schedule 114 is then stored in the database.

An approved change 116 to the audit schedule is also recorded in the database as a change log data object 118.

Figure 2:
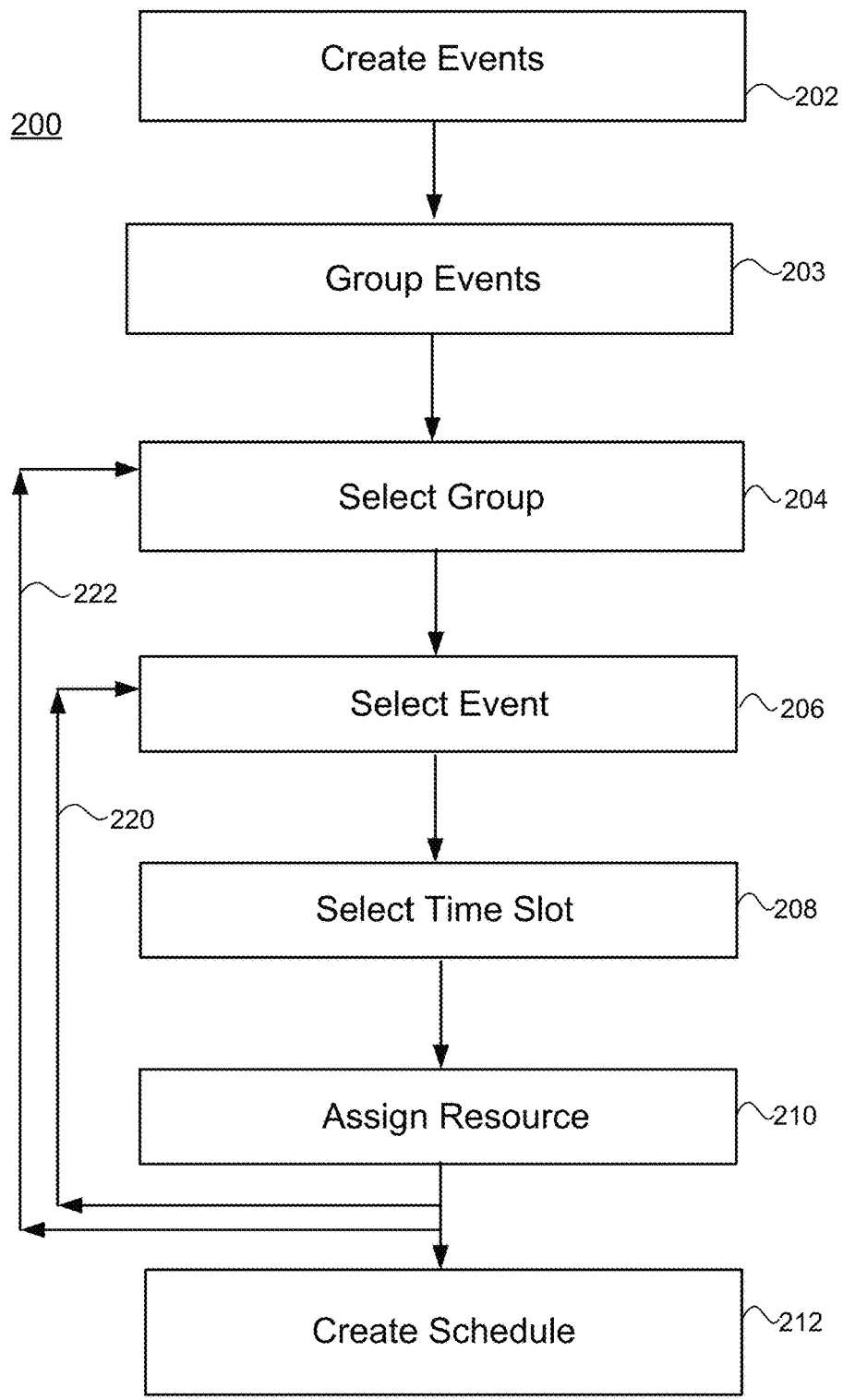
FIG. 2 shows a simplified flow diagram of a method according to an embodiment.

FIG. 2 is a simplified flow diagram showing details of an embodiment of an audit event scheduling procedure 200 which may be executed by the scheduling engine. At 202, information about the units, priorities, and audit types present within the master data set is merged in order to create audit events. During this early stage in the procedure, the audit events receive identification numbers, but remain unassigned to specific auditors or dates.

At 203, audit events are grouped by priority and duration and build units similar to sorted card decks. This grouping step reduces complexity and runtime by ensuring that critical units be considered with a higher priority.

At 204, the audit group with the highest priority and longest duration of the audit event is selected. At 206, a random audit event within the selected audit group is selected.

At 208, a time slot for the audit event is selected. Depending upon the particular distribution approach, the earliest available time slot in the calendar is inspected. If for that time slot, the maximum number of parallel audit events is not exceeded and resources for the considered audit type are available, the audit event is scheduled for that slot. Otherwise, the next earliest free time slot is examined. This is repeated as long as there is no complete match of criteria found or the end of the considered calendar is reached.

At 210, resources are assigned to the scheduled audit event. The calculated start and end date will be entered to the audit event object, as well as the ID's of the assigned auditors. The audit event will be added to the calendar and a resource availability plan may be adjusted accordingly. The considered audit event will be removed from the audit group.

If no time slot with available resources is ultimately found and the end of the calendar is reached, the audit event will not be assigned to the calendar. Instead, it will be added to the error log.

As indicated by the loop 220, the previous steps are repeated as long as the audit group contains audit events. If the audit group is emptied, it will be deleted and the procedure moves in loop 222 to events of the audit group having the next highest priority.

At 212, when no more audit groups are available, the audit schedule is created and displayed.

Details of various embodiments are now described. In particular, databases offer a useful way of storing large volumes of data that may be organized into complex data structures. Embodiments leverage database data available to an enterprise, to define the potential audit scope for a predetermined period, and to create a specific periodic audit schedule that considers levels of criticality and audit history for previous time periods.

A company audit requirement profile may be created based on organizational structure, unit types, and unit risk level. An availability plan of resources may be drafted for the time period in question.

Based on this information, embodiments propose an audit schedule for the selected period. Manual entry of (e.g., urgent) audits or changes is possible at any time and is logged for an audit trail.

Figure 3:
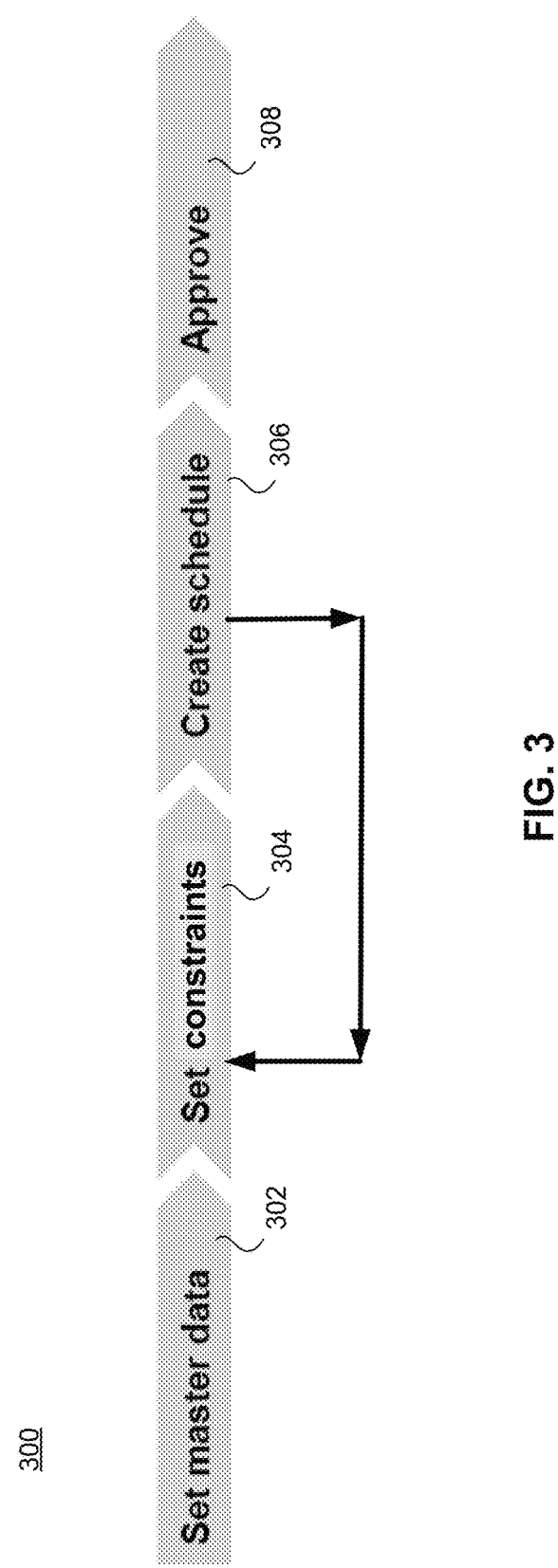
FIG. 3 shows an overview of a process according to an embodiment.

FIG. 3 presents a simplified overview of application of the process 300 of the proposed approach. Process step 302 shows collection of audit objects, definition of audit and priority types, and setting of available calculation approaches. Also, an amount of resources is maintained as master data set and reviewed periodically.

Process step 304 provides the most current constraints before creation of the audit schedule. Here, the resource availability plan is completed.

Selected time periods can be marked as reserved in the calendar. A maximum number of parallel audit events and distribution parameters of audit events are set. Audits that are already planned may be maintained in the calendar directly.

A third step 306 is an automatic calculation of the required audit events and their schedule for the selected period. Free dates in the calendar are blocked.

Proposed audit events are placed according to considerations that may include but are not limited to audit criteria, distribution parameters, and availability of resources specified in the previous process step. Required resources are assigned to audit events. For each resource, an individual audit schedule will be proposed.

As shown, the second through third steps of FIG. 3 can be repeated to achieve optimal utilization of available resources and a better distribution of workload. Such recalculation may be performed after changing the distribution parameters.

It is noted that the master data is not influenced by the creation of an audit schedule. For example, resource availability is reset to initial state if the schedule is created again by running the program.

A fourth process step 308 is the evaluation and manual adjustment of the created audit plan. The individual audit plan for each resource will be updated automatically.

Finally the audit schedule is to be approved by the management board. Any required changes on an approved audit schedule are logged in order to document the delta to the approved schedule.

It is possible to limit the volume of changes according to the internal company requirements. New board approval procedures may be initiated if the limit is exceeded.

EXAMPLE

A particular example is now presented in connection with FIGS. 4-10. This example describes an approach integrated with an existing Audit Management product available from SAP SE of Walldorf, Germany, as a component of SAP Assurance and Compliance Software including the risk structure defined by SAP's Governance, Risk, and Compliance (GRC) platform.

As mentioned above, embodiments reference data objects that are stored in a database. In particular, those data objects are used to automatically calculate audit events and their schedule for the selected time frame.

Figure 4:
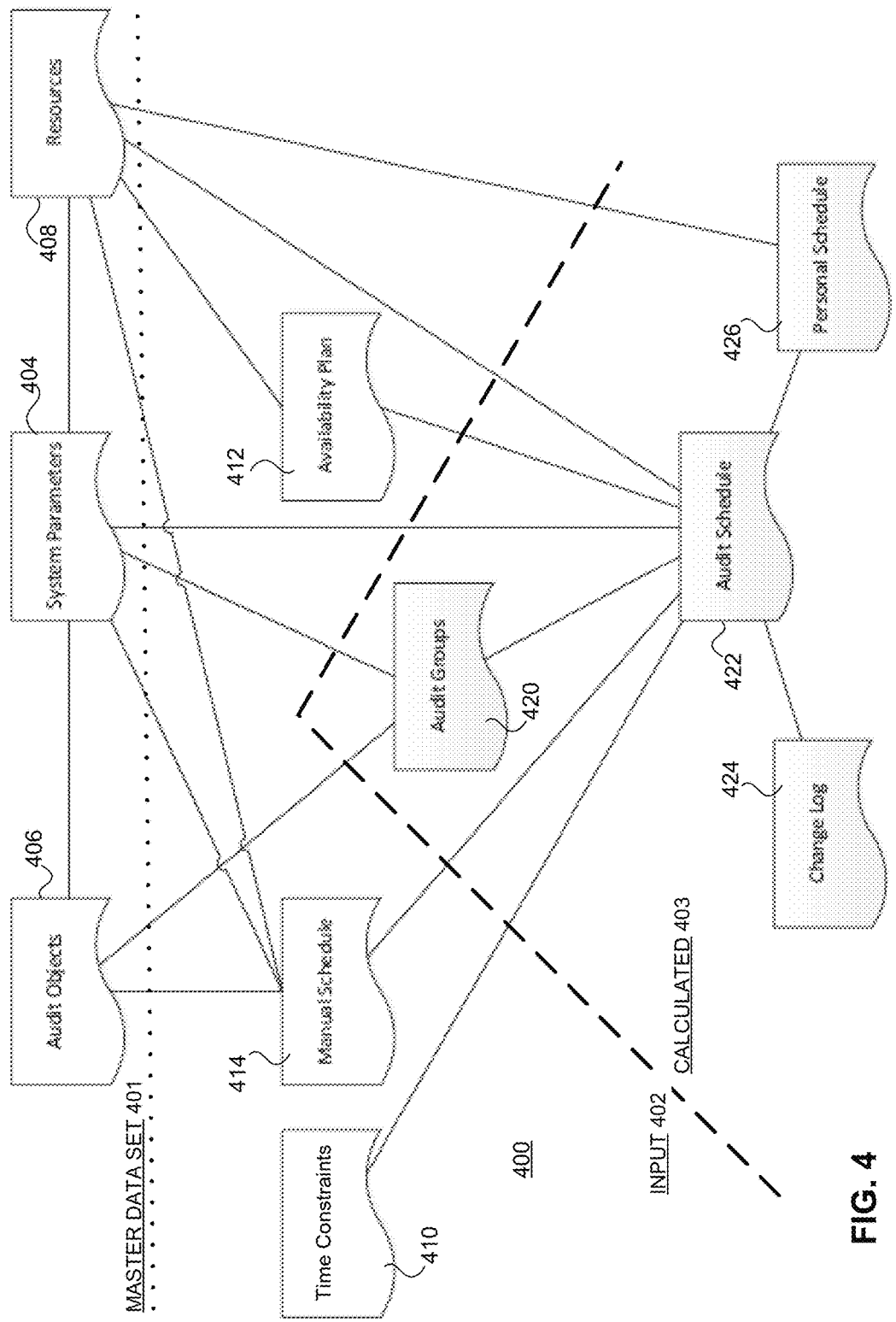
FIG. 4 shows a plurality of data objects.

FIG. 4 shows a plurality of data object groups 400 and their dependencies. The data objects 402 are used as input for determining an audit schedule. The data objects 403 are calculated by the system from those inputs.

A detailed list of exemplary possible data objects is presented in Table 1 below.

TABLE 1

| # | Data object | Description | Example |
|---|---|---|---|
| 1 | System parameters: Max number of parallel audit events | Limitation for audits performed in parallel at same time. | 3 |
| 2 | System parameters: Required auditors per audit type | Required number of auditors for the audit type. | 2/Process Audit |
| 3 | System parameters: Audit duration per audit type | Expected duration for the audit type. | 8 days/Process Audit |
| 4 | System parameters: Audit priorities | Definition of audit priorities applicable for the company. | high; medium; low |
| 5 | System parameters: Distribution type for audit planning | Selection of rules for distribution of the audits. | left to right or even distributed |
| 6 | System parameters: Approval levels | Definition of levels for approval step. | L1|L2 |
| 7 | System parameters: Max changes without new L1 approval | Limitation for amount of changes without new L1 approval. | 5 |
| 8 | Audit objects: Audit type | Definition of audit types applicable for the company. | PA|Process Audit; SA|Security Audit; FA|Financial Audit; GA|Government Audit; TA|Technical Audit; |
| 9 | Audit objects: Unit | Organizational, service or product unit, as used for risk structure at SAP GRC. | MCD |
| 10 | Audit objects: Unit priorities | Definition of audit priorities applicable for the unit. | MCD|PA|high |
| 11 | Resources: Auditor | Auditor Names or User IDs and audit types supported by this auditor. | Max M.|PA |

TABLE 1-continued

| # | Data object | Description | Example |
|---|---|---|---|
| 12 | Time constraints: Date block | Restrictions in calendar to be excluded from the audit planning. Typically used to block vacation period or holidays. | CW12 |
| 13 | Manual schedule and Audit schedule: Audit event | Audit event created manually based on current demand or calculated automatically based on availability of resources, free time slots and given constrains. This data object includes the following information: audit event ID, Unit, audit type, audit priority, start and end date, assigned resources and log | 8\|MCD\|PA\|high\| 01.08.2016\| 10.08.2016\|Max M.\| Event created on 24.09.2015 |
| 14 | Availability plan: Auditor block | Restrictions in auditor's availability typically used to block vacation or holidays. | CW12 |
| 15 | Audit Groups: Audit group | Grouping of units by audit type, priority and duration. | List of Units\|PA\|high\| 8 days |
| 16 | Personal schedule: Assigned audit event | Audit events related to the specific Auditor, specified by Audit event ID, Unit, audit type, audit priority, start and end date. | 8\|MCD\|PA\|high\| 01.08.2016\| 12.08.2016 |
| 17 | Change log: Audit event change | Change log | Change: New start and end date |

System parameters 404, audit objects 406, and resources 408 are used to construct the master data set 401. Example audit objects listed as #8-10 in Table 1 include:
 audit type (e.g., technical, process, security, or financial);
 unit (organizational, service, or product); and
 unit priorities (e.g., high, medium, low).

FIG. 5 various audit objects and parameters which may be considered in determining an audit schedule. These parameters include:
 unit;
 unit identifier;
 unit risk level;
 audit type;
 audit type identifier;
 audit type duration;
 audit type priority;
 audit type Full Time Employee (FTE).

Example system parameters listed as #1-7 in Table 1 include:
 a maximum # of parallel audit events;
 required auditors per audit type;
 audit duration per audit type;
 audit priorities;
 distribution type for audit planning;
 approval levels; and
 maximum changes without new approval.

An example resource listed as #11 in Table 1, is individual auditor identity.

The data collection offered by the master data set is already sufficient to create a basic audit schedule without special features. For a more realistic result, however, an additional specification of time constraints 410 and a resource availability plan 412 may be utilized.

Table 1 lists time constraints as item #12. Table 1 lists the resource availability plan as item #14. For example, if a vacation period or public holidays are maintained, the calculated audit schedule will take these factors into account.

Manual plan adjustments 414 occurring after sign-off, may be handled as separate data objects. Table 1 above lists the manual schedule as item #13.

Figure 6:
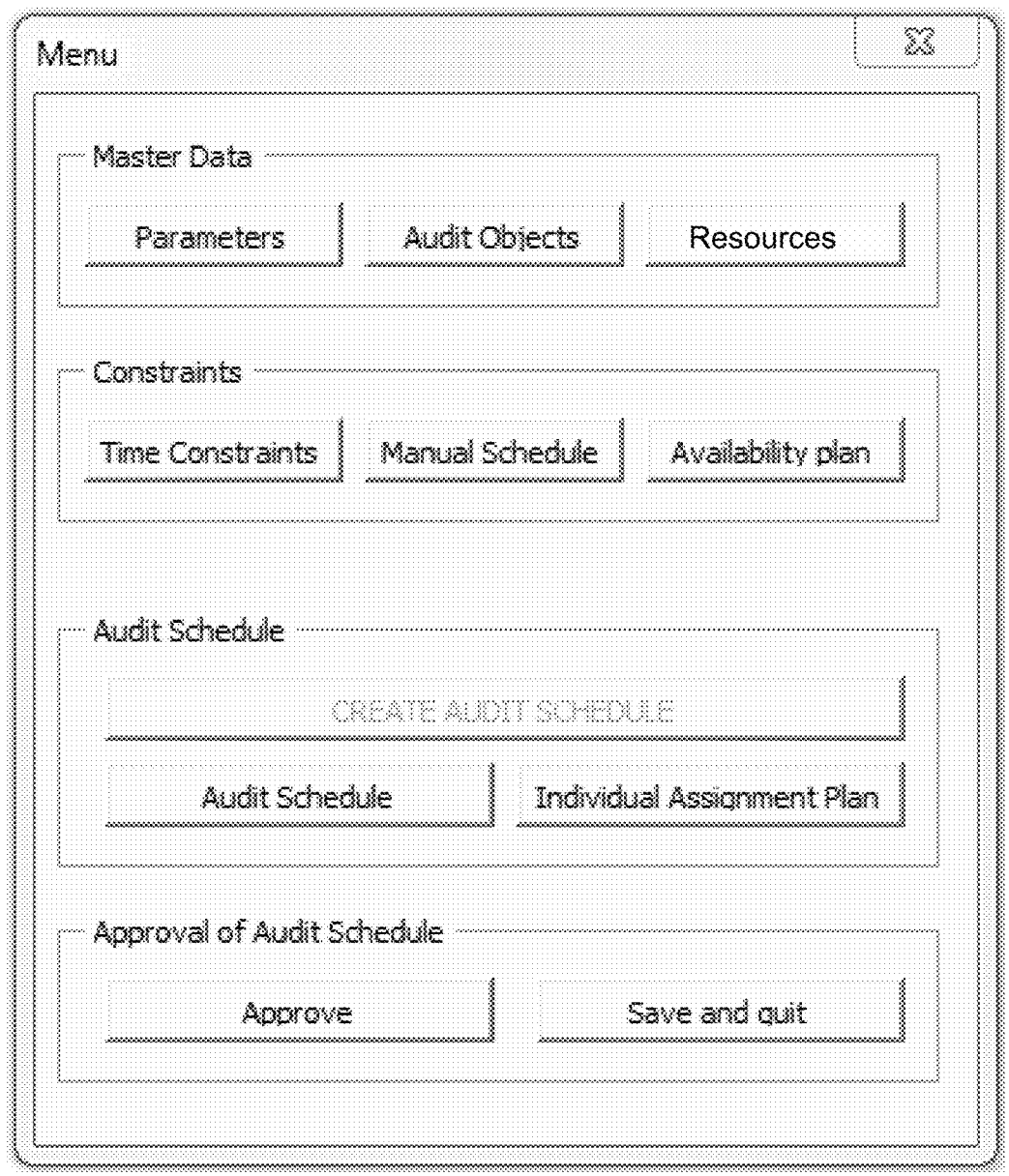
FIG. 6 shows an embodiment of a user interface.

Setting and maintenance of audit objects, system parameters, resources, etc. can be addressed according to various strategies and approaches. For example, FIG. 6 is a view showing a simplified user interface (UI) for audit scheduling determination according to an embodiment. The elements of various tiers of the UI of FIG. 6, mirror the arrangement of the data objects in FIG. 4.

The various inputs just described, are processed by the scheduling engine in order to produce corresponding outputs relating to audit scheduling. Those outputs are the audit groups 420, audit schedule 422, change log 424, and personal schedule 426.

Figure 7:
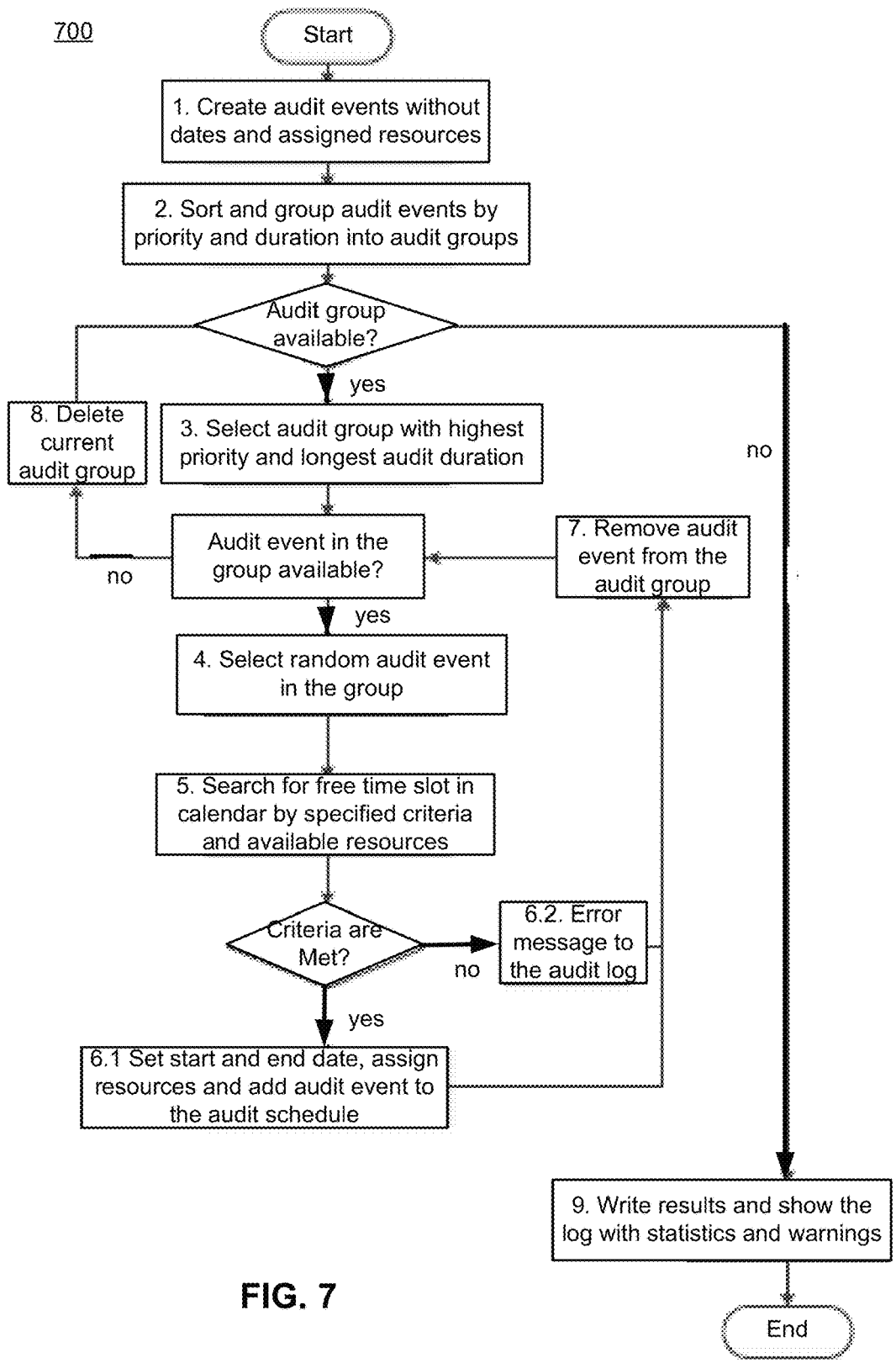
FIG. 7 shows a simplified flow of data processing according to an embodiment.

Calculation of the audit schedule is now explained in more detail. FIG. 7 is a simplified view of a procedure 700 according to an embodiment.

A precondition for successful application of this procedure is accurate maintenance of master data and relevant constraints. Upon those being set, the procedure can calculate the audit schedule as follows.

At 1, the information about the units, priorities, and audit types is merged to audit events. The audit events receive identification numbers, but stay unassigned to the auditors or dates.

At 2, next the audit events are clustered according to priority, duration, and build units into audit groups, in a manner similar to sorted card decks. This grouping is performed prior to the commencement of actual planning of audit events, to reduce complexity and runtime by keeping the requirement that critical units are considered with a higher priority.

At 3, the audit group with the highest priority and longest duration of the audit event is selected. At 4, within the selected audit group a random audit event is considered.

At 5, a distribution approach is used for the placement of audit events according to the audit schedule. Various techniques may be used.

One approach for the placement of audit events involves a left-to-right distribution, in which audit events are distributed as early (i.e., "to the left") as possible, leaving space later. A different audit distribution approach is even distribution (see system parameter #5 of Table 1).

For a "left-to-right" distribution, this audit event placement step is performed as follows. First, seek the earliest free time slot in the calendar and check if the maximum number of parallel audit events is not exceeded and resources for the considered audit type are available. If not, then seek the next earliest free time slot. This is repeated as long as no complete match of criteria is found, or the end of the considered calendar is reached.

During the runtime of 5, one of the following actions will be initiated.

At 6.1 the maximum number of parallel audit events is not exceeded and resources for the considered audit type are available. In this case, the calculated start and end date will be entered to the audit event object, as well as the ID's of the assigned auditors. The audit event will be added to the calendar and the resource availability plan changed accordingly.

At 6.2 the criteria are not met and the end of the calendar is reached. The audit event will not be assigned to the calendar but added to the error log.

At 7 the considered audit event will be removed from the audit group.

At 8, the steps 4-7 will be repeated so long as the audit group contains audit events. If the audit group is empty, it will be deleted and the program repeats step number 3.

At 9, when no more audit groups are available the audit schedule will be additionally transformed to the personal audit schedule for each auditor. The audit schedule will be displayed. If any audit events have not been added to the calendar, a warning and/or respective error log are indicated.

Figure 8:
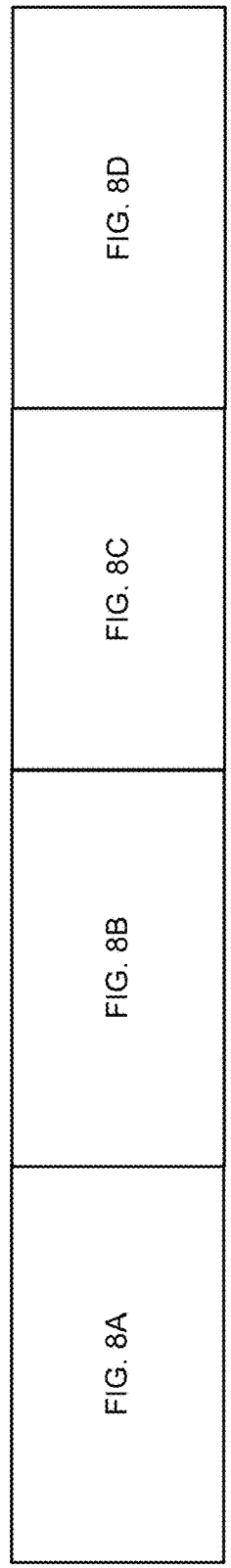

FIGS. 8-8A show simplified views of an audit schedule that is generated according to the instant example. In this audit schedule, audit events represented by the M1 (FA Global Travel) cell 802 and the M2 (PA Global Travel) cell 804 are set manually. Here "M" designates a manually created audit event. Other objects are calculated automatically.

Calendar weeks (CWs) 1, 2, 11, and 34-36 are excluded from the planning period. The maximum number of three audits in parallel is reached.

According to the selected "left-to-right distribution", the period from CW3 to CW41 is consistently used for planning audit events. Starting at CW42, the work load is trailing off and there is some buffer for unforeseen audits during the year.

Figure 8D:
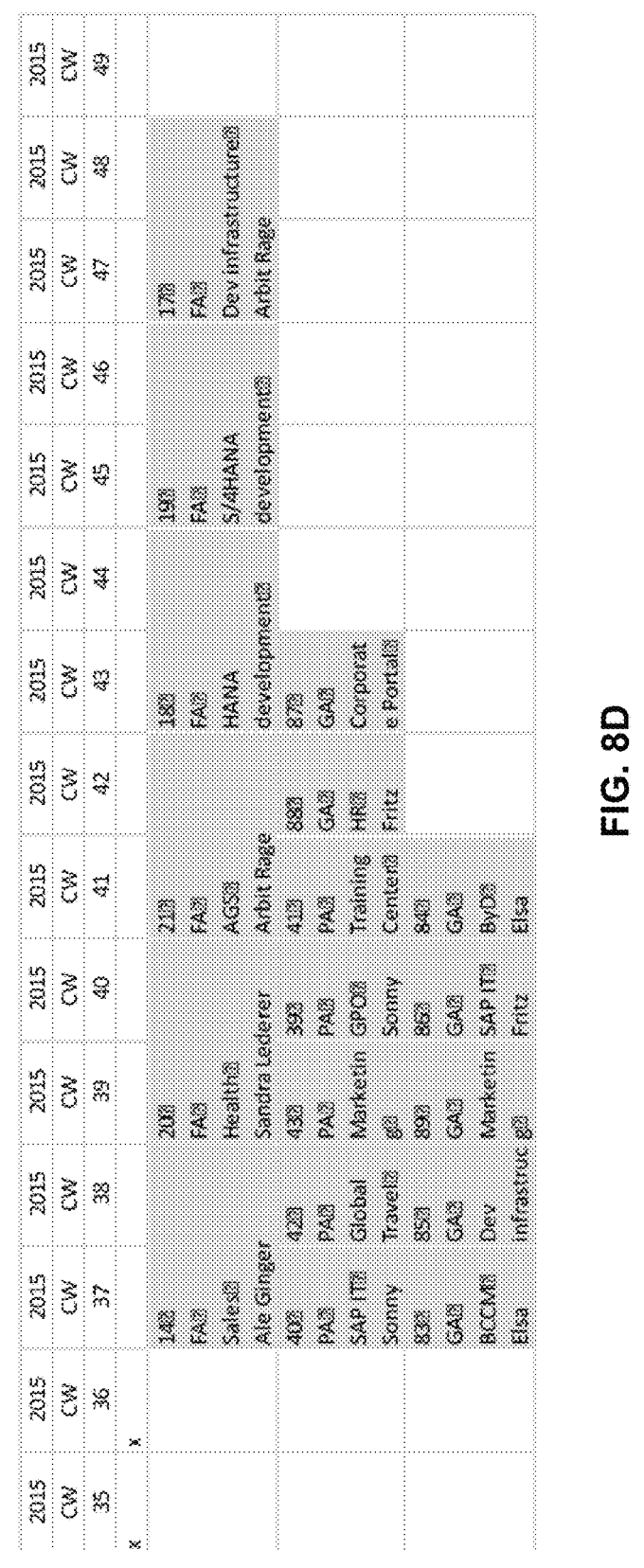

FIGS. 8-8D show the audit schedule organized with rows according to the three different audits that are taking place in parallel. However, FIG. 4 also shows another possible output in the form of a personal schedule.

Figure 9:
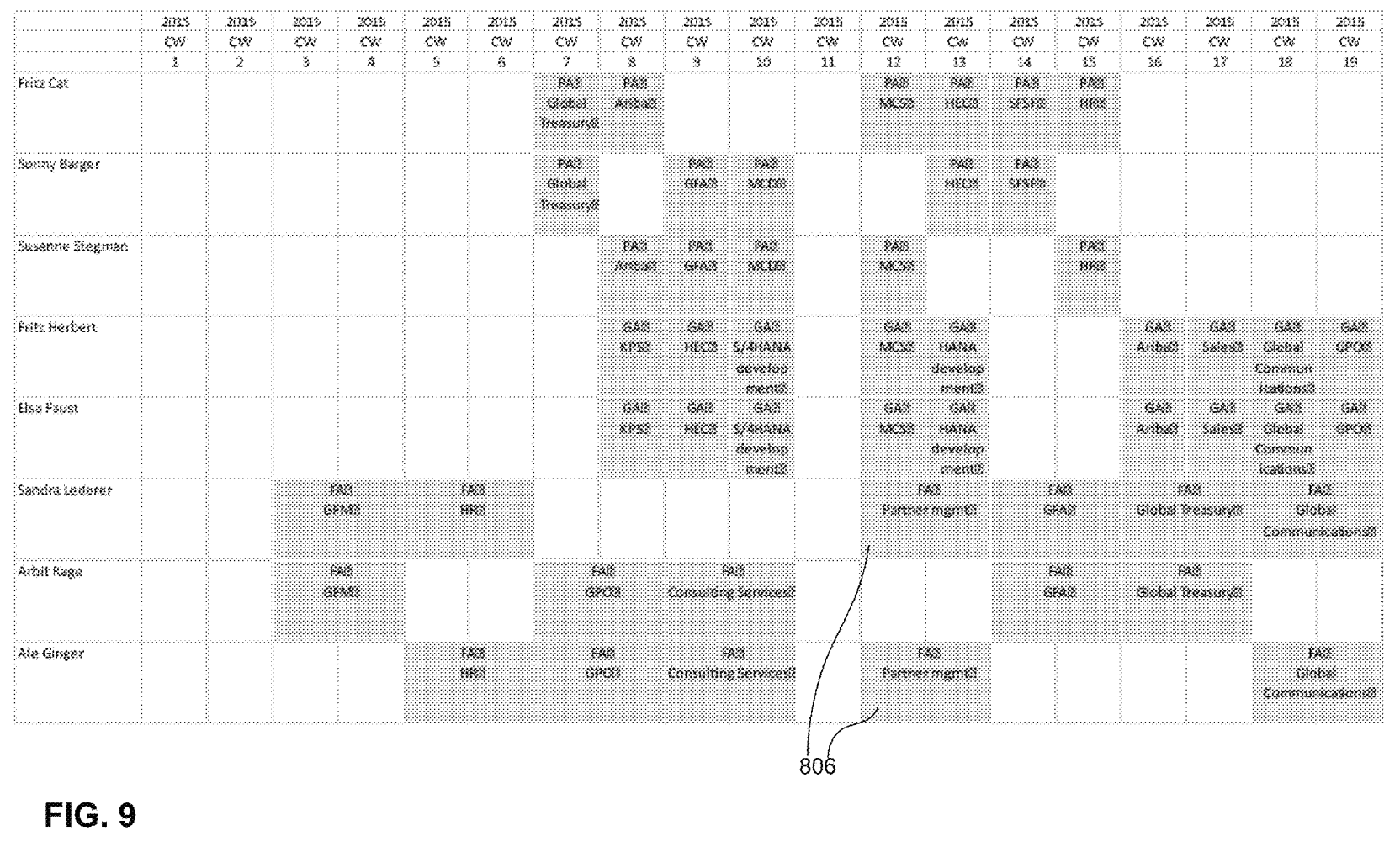

Accordingly, FIG. 9 shows an individual assignment plan. Here, the rows are organized according to different auditor resources. This assignment plan shows that no single auditor is "double-booked" with multiple audit tasks in a same time period (CW).

Based upon displayed results (e.g., either the schedule or assignment plan), the user can change some parameters or constraints and start recalculation in order to find a more suitable audit schedule. Alternatively the user may decide to keep the particular audit schedule, and initiating an approval process with management.

Once approved, any changes to a schedule must be carefully tracked in order to preserve integrity of the audit. Accordingly, FIG. 4 also shows a change log as an output of the processing to determine audit scheduling.

FIG. 10 shows details of a change event data object reflecting a change to the cell 806 (audit event 7) of the approved audit schedule of FIG. 8. In particular, this data object references a log confirming particulars of the changes made to the audit event, including approval for those changes.

In conclusion, embodiments provide efficient and reproducible audit planning techniques. Embodiments resolve issues accompanied with a time consuming determination of a periodic audit schedule. Embodiments also lessen the role of human discretion in audit scheduling, thereby reducing the possibility of introduction of bias/prejudice into the process.

Audit planning embodiments use a card deck similar grouping of potential audit events. This ensures consideration of potential audit objects and sorting thereof by their priority and duration, before actual selection of relevant objects begins.

Thus, critical units may be considered with higher priority, and every free time slot in the calendar may be filled. Different options for audit event distribution (e.g., "left-to-right" or even distribution) may allow multiple versions of the audit schedule to be created, and selection of an optimal schedule the best suitable for formal approval an sign-off While FIG. 1 shows the scheduling engine as separate from the database, this is not required. Certain embodiments may implement the audit scheduling determination by leveraging the power of a database engine, for example as present in an in-memory database. One example of such an in-memory database engine is that of the HANA in-memory database available from SAP SE of Walldorf, Germany.

Figure 11:
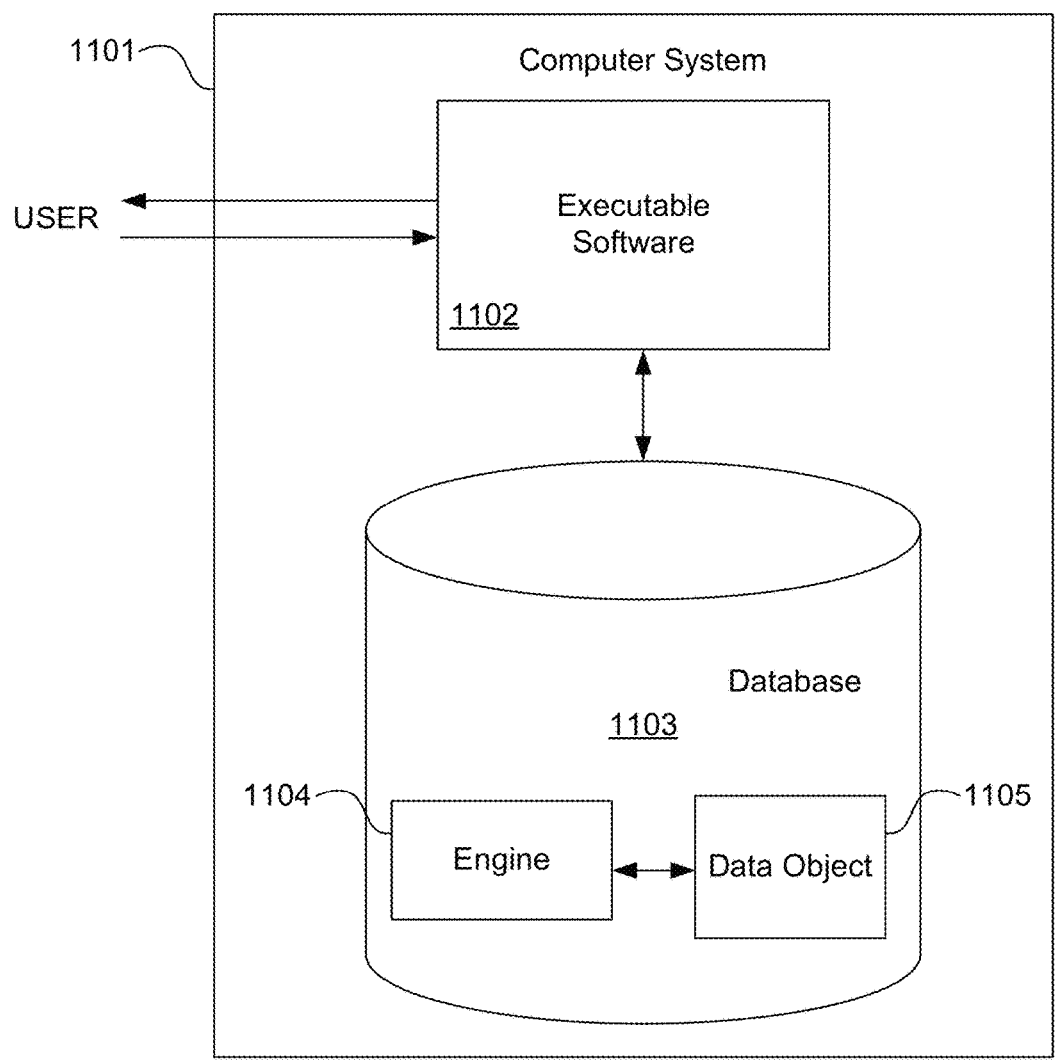
FIG. 11 illustrates hardware of a special purpose computing machine configured to implement audit scheduling determination according to an embodiment.

For example, FIG. 11 illustrates hardware of a special purpose computing machine configured to implement audit scheduling determination in a data layer according to an embodiment. In particular, computer system 1101 comprises a processor 1102 that is in electronic communication with a non-transitory computer-readable storage medium comprising a database 1103. This computer-readable storage medium has stored thereon code 1105 corresponding to a scheduling engine. Code 1104 corresponds to a data object. Code may be configured to reference data stored in a database of a non-transitory computer-readable storage medium, for example as may be present locally or in a remote database server. Software servers together may form a cluster or logical network of computer systems programmed with software programs that communicate with each other and work together in order to process requests.

Figure 12:
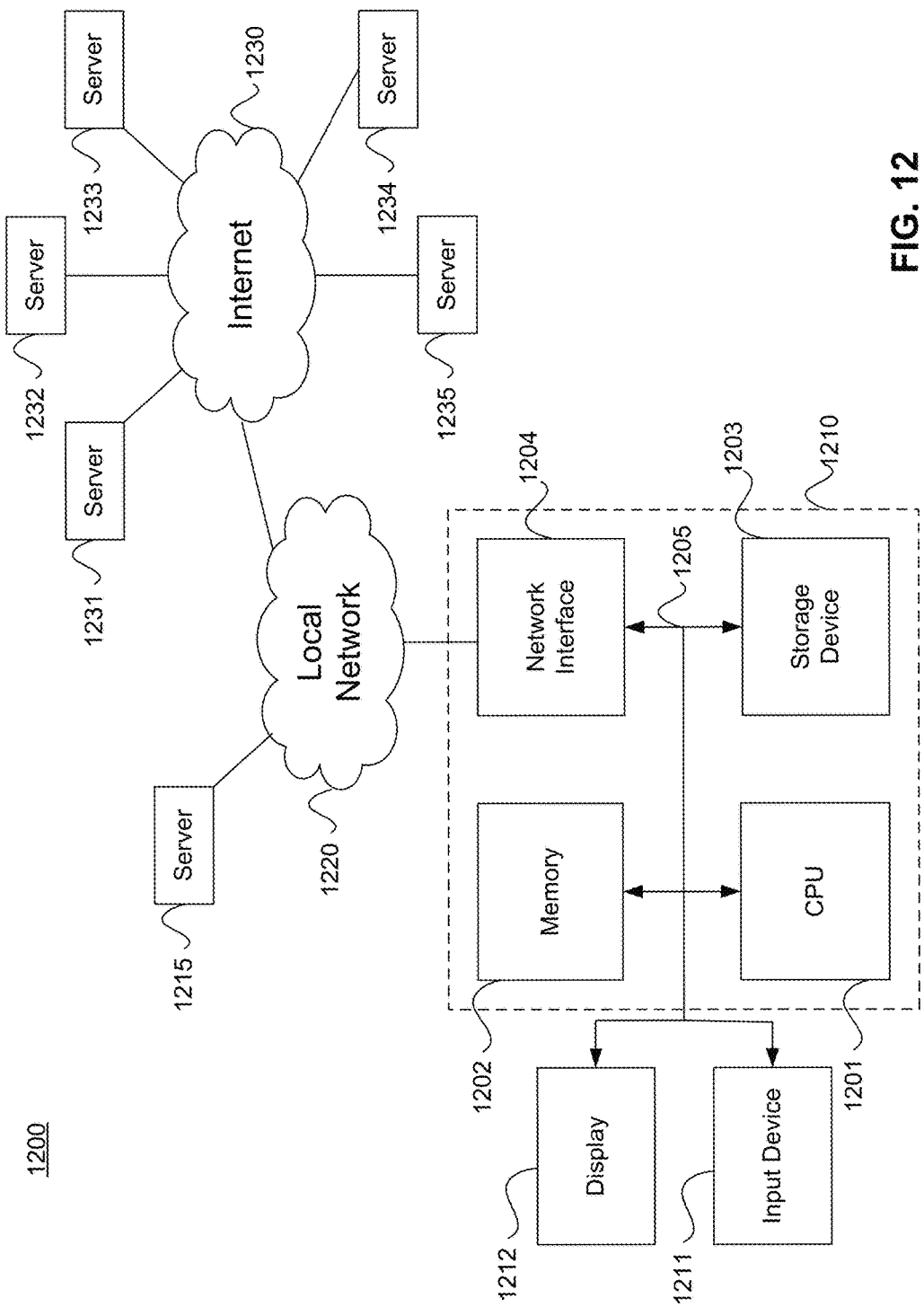
FIG. 12 illustrates an example computer system.

An example computer system 1200 is illustrated in FIG. 12. Computer system 1210 includes a bus 1205 or other communication mechanism for communicating information, and a processor 1201 coupled with bus 1205 for processing information. Computer system 1210 also includes a memory 1202 coupled to bus 1205 for storing information and instructions to be executed by processor 1201, including information and instructions for performing the techniques described above, for example. This memory may also be used for storing variables or other intermediate information during execution of instructions to be executed by processor 1201. Possible implementations of this memory may be, but are not limited to, random access memory (RAM), read only memory (ROM), or both. A storage device 1203 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 1203 may include source code, binary code, or software files for performing the techniques above, for example. Storage device and memory are both examples of computer readable mediums.

Computer system 1210 may be coupled via bus 1205 to a display 1212, such as a cathode ray tube (CRT) or liquid crystal display (LCD), for displaying information to a computer user. An input device 1211 such as a keyboard and/or mouse is coupled to bus 1205 for communicating information and command selections from the user to processor 1201. The combination of these components allows the user to communicate with the system. In some systems, bus 1205 may be divided into multiple specialized buses.

Computer system 1210 also includes a network interface 1204 coupled with bus 1205. Network interface 1204 may provide two-way data communication between computer system 1210 and the local network 1220. The network interface 1204 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface 1204 sends and receives electrical, electromagnetic, or optical signals that carry digital data streams representing various types of information.

Computer system 1210 can send and receive information, including messages or other interface actions, through the network interface 1204 across a local network 1220, an Intranet, or the Internet 1230. For a local network, computer system 1210 may communicate with a plurality of other computer machines, such as server 1215. Accordingly, computer system 1210 and server computer systems represented by server 1215 may form a cloud computing network, which may be programmed with processes described herein. In the Internet example, software components or services may reside on multiple different computer systems 1210 or servers 1231-1235 across the network. The processes described above may be implemented on one or more servers, for example. A server 1231 may transmit actions or messages from one component, through Internet 1230, local network 1220, and network interface 1204 to a component on computer system 1210. The software components and processes described above may be implemented on any computer system and send and/or receive information across a network, for example.

The above description illustrates various embodiments of the present invention along with examples of how aspects may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A computer-implemented method comprising:
    creating a plurality of audit event data objects from master data stored in a database, the master data comprising audit objects, system parameters, and resources, wherein the database comprises an in-memory database;
    storing the plurality of audit event data objects in the in-memory database;
    creating audit groups by determining unit types of the master data shared between the audit event data objects;
    establishing a priority of the audit groups;
    randomly selecting an audit event data object from one of the plurality of audit groups according to the priority and a duration;
    determining availability of a resource during a time slot selected based upon a distribution, wherein the determining is performed by an engine of the in-memory database;
    where availability is present, assigning the audit event to the time slot;
    shuffling through remaining audit event data objects according to the priority, to assign time slots and resources to the remaining audit event data objects; and
    storing in the database an audit schedule comprising the plurality of audit event data objects including respective time slot and resource assigned.

2. A method as in claim 1 wherein the distribution comprises left-to-right.

3. A method as in claim 1 wherein the distribution comprises even distribution.

4. A method as in claim 1 wherein the priority is determined from a unit type priority stored in the in-memory database.

5. A method as in claim 1 wherein the duration comprises an audit type duration stored in the in-memory database.

6. A method as in claim 1 wherein the unit type comprises a product, a service, or an organization.

7. A method as in claim 1 further comprising recording in the in-memory database an approved change request in a change log data object of the audit schedule.

8. A non-transitory computer readable storage medium embodying a computer program for performing a method, said method comprising:
    creating a plurality of audit event data objects from master data stored in an in-memory database, the master data comprising audit objects, system parameters, and resources;
    storing the plurality of audit event data objects in the in-memory database;
    creating audit groups by determining unit types of the master data shared between the audit event data objects, wherein the unit type comprises a product, a service, or an organization;
    establishing a priority of the audit groups;
    randomly selecting an audit event data object from one of the plurality of audit groups according to the priority and a duration;
    determining, by an in-memory database engine of the in-memory database, availability of a resource during a time slot selected based upon a distribution;
    where availability is present, assigning the audit event to the time slot;
    shuffling through remaining audit event data objects according to the priority, to assign time slots and resources to the remaining audit event data objects; and
    storing an audit schedule comprising the plurality of audit event data objects including respective time slot and resource assigned.

9. A non-transitory computer readable storage medium as in claim 8 wherein the distribution comprises left-to-right.

10. A non-transitory computer readable storage medium as in claim 8 wherein the distribution comprises an even distribution.

11. A non-transitory computer readable storage medium as in claim 8 wherein the priority is determined from a unit type priority stored in the in-memory database.

12. A non-transitory computer readable storage medium as in claim 8 wherein the duration comprises an audit type duration stored in the in-memory database.

13. A non-transitory computer readable storage medium as in claim 8 wherein the method further comprises recording in the in-memory database an approved change request in a change log data object of the audit schedule.

14. A computer system comprising:
one or more processors;
a software program, executable on said computer system, the software program configured to cause an in-memory database engine of an in-memory database to:
create a plurality of audit event data objects from master data stored in the in-memory database, the master data comprising audit objects, system parameters, and resources;
store the plurality of audit event data objects in the in-memory database;
create audit groups by determining unit types of the master data shared between the audit event data objects;
establish a priority of the audit groups;
randomly select an audit event data object from one of the plurality of audit groups according to the priority and a duration;
determine availability of a resource during a time slot selected based upon a distribution;
where availability is present, assign the audit event to the time slot;
shuffle through remaining audit event data objects according to the priority, to assign time slots and resources to the remaining audit event data objects; and
store in the in-memory database, an audit schedule comprising the plurality of audit event data objects including respective time slot and resource assigned.

15. A computer system as in claim 14 wherein the distribution comprises left-to-right.

16. A computer system as in claim 14 wherein the distribution comprises an even distribution.

17. A computer system as in claim 14 wherein the priority is determined from a unit type priority stored in the in-memory database.

18. A computer system as in claim 14 wherein the duration comprises an audit type duration stored in the in-memory database.

19. A computer system as in claim 14 wherein the software program is further configured to cause the in-memory database engine to record in the in-memory database an approved change request in a change log data object of the audit schedule.

* * * * *